J. C. COOGAN.
HEATING SYSTEM.
APPLICATION FILED JAN. 8, 1912.
1,275,852.
Patented Aug. 13, 1918.
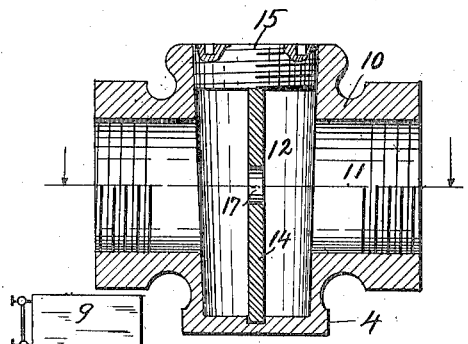
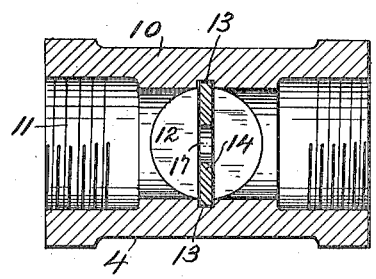
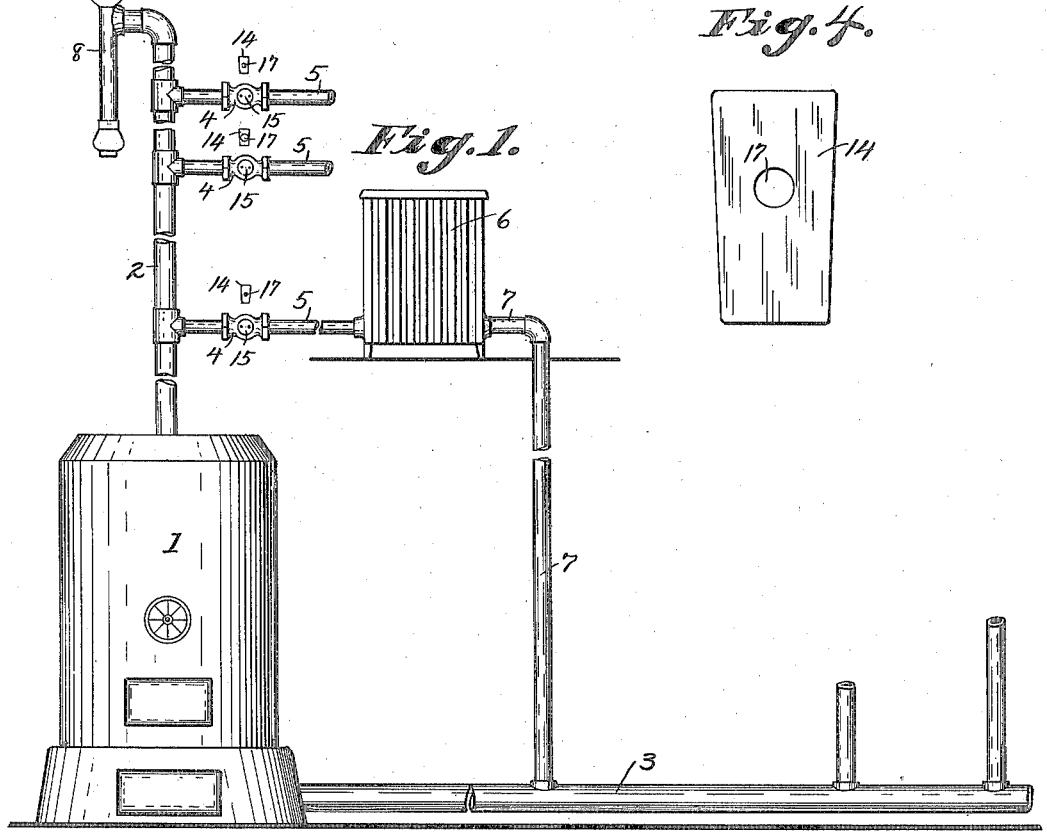

UNITED STATES PATENT OFFICE.

JESSE C. COOGAN, OF MILWAUKEE, WISCONSIN.

HEATING SYSTEM.

1,275,852.   Specification of Letters Patent.   Patented Aug. 13, 1918.

Application filed January 3, 1912. Serial No. 669,979.

*To all whom it may concern:*

Be it known that I, JESSE C. COOGAN, a citizen of the United States, residing at Milwaukee, county of Milwaukee, and State of Wisconsin, have invented new and useful Improvements in Heating Systems, of which the following is a specification.

My invention relates to improvements in heating systems and pertains especially to that class of systems in which a rapid circulation of the heating fluid is maintained. My invention is particularly adapted for use in connection with liquid heating systems, in which the liquid either circulates under a pressure greater than atmospheric pressure, or is mechanically driven through the pipes or radiators by means of pumping mechanism.

The object of my invention is to provide means for controlling the circulations to the different parts of the system, whereby a uniform circulation may be maintained. It is possible to calculate with great exactness the relative resistance to the flow of the liquid in the different branches of the system and to accurately determine the volume requirements for each branch, but it is not practical to employ pipes of different sizes, whereby each is adapted to the requirements of that portion of the system to which it pertains. Attempts have heretofore been made to adjust controlling valves in such positions that they will accurately regulate the delivery of the heating fluid to each branch of the system, but such valves are frequently readjusted either by inexperienced persons, or through carelessness and the circulation within the system thereby interfered with.

My invention, therefore, contemplates the provision of means for permanently limiting the full capacity of a valve or a fitting for liquid delivery so that variations in the adjustment of the valves will not affect the liquid delivery unless the valve is closed or nearly closed.

In the drawings:—

Figure 1 is a general view, illustrative of a water heating system to which my invention is applied, showing variations of the various branches, each provided with one of my improved regulator fittings, the capacity of each fitting being indicated by a detail view of the interior controlling plate at the side of each fitting.

Fig. 2 is a detail sectional view of one of the fittings drawn to a plane cutting the axis of the liquid duct.

Fig. 3 is a similar view, drawn to a plane at right angles to that of Fig. 2.

Fig. 4 is an enlarged detail view of one of the controlling plates.

Like parts are identified by the same reference characters throughout the several views.

A heater 1 is provided with a hot water main 2 and a return pipe or main 3. The water circulates from the main 2 through any one of my improved fittings 4 into a branch pipe connection 5, radiator 6, return pipe 7 and return main 3. The system illustrated is a closed system provided with a relief valve at 8, whereby undue pressure may be relieved by the passage of fluid to an expansion tank 9.

Each of the fittings comprises a casing 10, having a tubular passage 11 therethrough, the walls of which are threaded at each end to receive the pipes. The central portion of the fitting is provided with a transversely extending cavity 12, preferably tapered and provided with channels 13 in opposing side walls to receive a partition member in the form of a plate 14 in a position to obstruct the flow of liquid through the passage 11 of which the cavity 12 forms the central portion. A removable plug 15 closes one end of the cavity 12. This plug is at the larger end of the cavity 12, and when removed, the partition member 14 may be removed or inserted in the cavity.

The partition member is provided with an aperture 17, the capacity of which determines the capacity of the fitting for liquid delivery. The said plug 15 is normally seated upon the adjacent end of the partition member 14 when closed preventing any passage of fluid around the enlarged end of the partition 14 and causing the entire flow of the fluid through the casing 10 to pass through the aperture 17. It is therefore possible to use like fittings 4 for all the various branches of the heating system, each having a partition member 14 therein of the same size provided with an aperture 17 proportioned to the requirements of the branch to which it is applied. For example, assuming that one of the branches requires four times the circulation required for another branch, all the pipe connections in the two branches may be of any desired size, but the partition member 14 in the fitting 4 of one branch will be provided with an aperture 17 which is four times the capacity of the aperture 17 in the partition member of the fitting applied to the branch requiring the smaller amount of circulation. In Fig. 1 it will be observed that three branches are indicated in connection with a single main 2. Each of these three branches is provided with a fitting 4 having partition members 14, which are exactly alike with the exception that in each the opening 17 is of a different capacity from that of any of the others. It will of course be understood that the larger radiating units will require a greater volume of liquid in circulation through them than the smaller radiators, and the difference in the size of the radiators will ordinarily constitute the main factor in determining the selection of a partition member 14 with reference to the size of its aperture 17. It is necessary, however, to take into account also the length of the various runs of pipe and other conditions which may interfere to a greater or less extent with the circulation of the heating liquid, but in each instance the rate of flow may be determined and a partition member 14, having an aperture of proper size, selected. In case of an error in calculation, it can be easily remedied by unscrewing the plug 15 and substituting a member 14 of the proper capacity for the one erroneously inserted.

In Fig. 1, no valves are illustrated. It will be understood that in actual practice, valves will be employed in various parts of the system in the customary manner. Where employed, they will ordinarily be left fully open, the circulation being entirely determined by the partition members 14 in the various fittings. The capacity of the pipes, valve ports, etc., may therefore be made ample in all cases, so that an erroneous adjustment of the valve will have no effect upon the circulation, unless the valve is closed sufficiently to obstruct the circulation to a greater extent than it is obstructed by the partition 14. The use of valves will, however, be avoided as far as possible, and thus reduce to a minimum the difficulties due to carelessness or ignorant manipulation.

I claim—

1. A fitting for a radiator inlet pipe of a circulatory heating system, comprising a casing positioned at a point inaccessible to the user provided with an inlet and an outlet and having an intermediate chamber provided with a removable plate partition having a port of nonvariable predetermined capacity therethrough adapted for fluid delivery from the inlet to the outlet, said casing having an opening through which the partition may be inserted into said chamber, and a plug normally closing said casing opening and the passage around said partition.

2. A fitting for circulatory heating systems comprising the combination with a casing provided with a fluid passage therethrough having a central transversely extending tapered cavity, the walls of said cavity being provided with a channeled receiving seat, a set of non-adjustable regulating members adapted to be interchangeably applied to said seat, each of said regulating members being provided with an opening of different capacity from the openings in the other members, whereby the fitting may be adapted to suit the requirements of any given installation and a removable closure plug for said cavity seated upon the enlarged end of one of said regulating members when the device is in its closed assembled arrangement.

In testimony whereof I affix my signature in the presence of two witnesses.

JESSE C. COOGAN.

Witnesses:
LEVERETT C. WHEELER,
I. D. BREMER.